United States Patent
Chen

(10) Patent No.: US 11,949,594 B2
(45) Date of Patent: Apr. 2, 2024

(54) BIT INDEX EXPLICIT REPLICATION TRAFFIC ENGINEERING FOR BROADCAST LINK

(71) Applicant: Huawei Technologies Co., Ltd., Shenzhen (CN)

(72) Inventor: Huaimo Chen, Bolton, MA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/341,554

(22) Filed: Jun. 26, 2023

(65) Prior Publication Data

US 2023/0344763 A1    Oct. 26, 2023

Related U.S. Application Data

(63) Continuation of application No. PCT/US2021/065559, filed on Dec. 29, 2021.
(Continued)

(51) Int. Cl.
*H04L 45/17* (2022.01)
*H04L 45/42* (2022.01)
*H04L 45/745* (2022.01)

(52) U.S. Cl.
CPC .......... *H04L 45/745* (2013.01); *H04L 45/17* (2022.05); *H04L 45/42* (2013.01)

(58) Field of Classification Search
CPC ....... H04L 45/745; H04L 45/17; H04L 45/42; H04W 40/20; H04W 40/24
See application file for complete search history.

(56) References Cited

U.S. PATENT DOCUMENTS 10,153,967 B2 * 12/2018 Callon .................... H04L 45/24
10,291,511 B2 *  5/2019 Zhang .................... H04L 45/16
(Continued)

FOREIGN PATENT DOCUMENTS

CN    106453095 A  *  2/2017   ............ H04L 45/02
CN    110391977 A  * 10/2019   ............ H04L 41/065
(Continued)

OTHER PUBLICATIONS

Atlas, Ed., et al., "Basic Specification for IP Fast Reroute: Loop-Free Alternates," RFC 5286 Sep. 2008, 31 pages.
(Continued)

*Primary Examiner* — Oanh Duong
(74) *Attorney, Agent, or Firm* — Conley Rose, P.C.

(57) ABSTRACT

A method implemented by a network node in a Bit Index Explicit Replication Traffic/Tree Engineering (BIER-TE) domain is used to avoid duplicate packets. The method includes generating an improved bit index forwarding table (BIFT) containing a forwarding entry for a local area network (LAN)-connected adjacency from the network node to a pseudo node; and a secondary BIFT including a forwarding entry for a forward connected adjacency from the pseudo node to each of the pseudo node's next hop nodes except the network node; sending a packet containing a point to multipoint (P2MP) path with a bit position for the LAN-connected adjacency to the pseudo node according to the forwarding entry for the LAN-connected adjacency in the improved BIFT; and sending the packet to each of the pseudo node's next hop nodes on the P2MP path based on the secondary BIFT.

21 Claims, 10 Drawing Sheets

Related U.S. Application Data

(60) Provisional application No. 63/132,255, filed on Dec. 30, 2020.

(56) References Cited

U.S. PATENT DOCUMENTS

| | | | | |
|---|---|---|---|---|
| 10,341,221 | B2* | 7/2019 | Eckert | H04L 45/16 |
| 10,341,222 | B2* | 7/2019 | Eckert | H04L 12/4633 |
| 10,404,482 | B2* | 9/2019 | Wijnands | H04L 45/16 |
| 10,547,538 | B2* | 1/2020 | Chen | H04L 45/48 |
| 11,483,237 | B2* | 10/2022 | Dutta | H04L 47/724 |
| 2015/0078380 | A1* | 3/2015 | Wijnands | H04L 12/1886 370/390 |
| 2015/0138961 | A1* | 5/2015 | Wijnands | H04L 41/0668 370/228 |
| 2016/0254991 | A1* | 9/2016 | Eckert | H04L 12/4633 370/225 |
| 2021/0021507 | A1* | 1/2021 | Eckert | H04L 45/34 |

FOREIGN PATENT DOCUMENTS

| | | |
|---|---|---|
| EP | 34291431 A | 1/2019 |
| EP | 3731475 A2 | 10/2020 |
| EP | 3731475 A3 | 11/2020 |

OTHER PUBLICATIONS

Berger, et al., "The OSPF Opaque LSA Option," RFC 5250, Jul. 2008, 17 pages.

Bradner, "Key Words for Use in RFCs to Indicate Requirement Levels," RFC 2119, Mar. 1997, 3 pages.

Bryant, et al., "Remote Loop-Free Alternate (LFA) Fast Reroute (FRR)," RFC 7490, Apr. 2015, 29 pages.

Eckert, et al., "Protection Methods for BIER-TE," draft-eckert-bier-te-frr-02, Jun. 30, 2017, 16 pages.

Eckert, et al., "Protection Methods for BIER-TE," draft-eckert-bier-te-frr-03, Mar. 2018, 16 pages.

Eckert, et al., "Tree Engineering for Bit Index Explicit Replication (BIER-TE)," draft-ietf-bier-te-arch-09, Oct. 30, 2020, 48 pages.

Ginsberg, et al., "IS-IS Flooding Scope Link State PDUs (LSPs)," RFC 7356, Sep. 2014, 23 pages.

Hegde, et al., "Segment Protection for SR-TE Paths," draft-ietf-spring-segment-protection-sr-te-paths-00, Sep. 2020, 19 pages.

Katz, et al., "Bidirectional Forwarding Detection (BFD)," RFC 5880, Jun. 2010, 49 pages.

Leiba, "Ambiguity of Uppercase vs Lowercase in RFC 2119 Key Words," RFC 8174, May 2017, 4 pages.

Lindem, Ed., et al., "Extensions to OSPF for Advertising Optional Router Capabilities," RFC 7770, Feb. 2016, 15 pages.

Litkowski, et al., "Topology Independent Fast Reroute using Segment Routing," draft-ietf-rtgwg-segment-routing-ti-lfa-05, Nov. 15, 2020, 25 pages.

Narten, et al., "Guidelines for Writing an IANA Considerations Section in RFCs", RFC 5226, May 2008, 27 pages.

Psenak, et al., "OSPFv2 Prefix/Link Attribute Advertisement," RFC 7684, Nov. 2015, 15 pages.

Rosen, Ed., et al., "Multicast VPN Using Bit Index Explicit Replication (BIER)," RFC 8556, Apr. 2018, 17 pages.

Shand, et al., "IP Fast Reroute Framework," RFC 5714, Jan. 2010, 15 pages.

Wijnands, Ed., et al., "Multicast Using Bit Index Explicit Replication (BIER)," RFC 8279, Nov. 2017, 43 pages.

\* cited by examiner

200

| | 202 | 204 | 206 |
|---|---|---|---|
| | Adjacency Bit Position (SI:BitString) | Action | BFR-NBR (Next Hop) |
| 214 | 2' (6:00000010) | fw-connected | B |
| 216 | 5 (0:00010000) | Local-decap | |

| | 302 | 304 | 306 |
|---|---|---|---|
| | Adjacency Bit Position (SI:BitString) | Action | BFR-NBR (Next Hop) |
| 314 | 5' (6:00010000) | fw-connected | B |
| 316 | 12' (7:00001000) | fw-connected | F |
| 318 | 14' (7:00100000) | fw-connected | G |
| 320 | 15' (7:01000000) | fw-connected | H |
| 322 | 16' (7:10000000) | fw-connected | D |

| Adjacency Bit Position (SI:BitString) 402 | Action 404 | BFR-NBR (Next Hop) 406 |
|---|---|---|
| 414 — 13' (7:00010000) | fw-connected | C |
| 416 — 14' (7:00100000) | fw-connected | G |
| 418 — 15' (7:01000000) | fw-connected | H |
| 420 — 1 (0:00000001) | local-decap | |

| Adjacency Bit Position (SI:BitString) 502 | Action 504 | BFR-NBR (Next Hop) 506 |
|---|---|---|
| 514 — 3' (6:00000100) | fw-connected | B |
| 516 — 13' (7:00010000) | fw-connected | C |
| 518 — 15' (7:01000000) | fw-connected | H |
| 520 — 16' (7:10000000) | fw-connected | D |

| Adjacency Bit Position (SI:BitString) | Action | BFR-NBR (Next Hop) |
|---|---|---|
| 802 | 804 | 806 |
| 814 — 5' (6:00010000) | fw-connected | B |
| 816 — 12' (7:00001000) | fw-connected | F |
| 818 — 14' (7:00100000) | LAN-connected | Px |

| Adjacency Bit Position (SI:BitString) | Action | BFR-NBR (Next Hop) |
|---|---|---|
| 902 | 904 | 906 |
| 914 — 15' (7:01000000) | fw-connected | G |
| 916 — 17' (8:00000001) | fw-connected | H |
| 918 — 19' (8:00000100) | fw-connected | D |

| Adjacency Bit Position (SI:BitString) | Action | BFR-NBR (Next Hop) |
|---|---|---|
| 1014 — 4 (0:00010000) | local-decap | |
| 1016 — 18' (8:00000010) | LAN-connected | Px |

| Adjacency Bit Position (SI:BitString) | Action | BFR-NBR (Next Hop) |
|---|---|---|
| 1114 — 13' (7:00010000) | fw-connected | C |
| 1116 — 15' (7:01000000) | fw-connected | G |
| 1118 — 19' (8:00000100) | fw-connected | D |

```
Packet = the packet received by BFR;
For each BP k (from the rightmost in Packet's BitString)  {
    If (BP k is local decap adjacency)     {
        copies Packet, sends the copy to the multicast
        flow overlay and clears bit k in the Packet's BitString
    } ELSE IF (BP k is forward connect adjacency of the BFR) {
        finds the forwarding entry in the BIER-TE BIFT for the domain
        using BP k
        Copies Packet, updates the copy's BitString by
        clearing all the BPs for the adjacencies of the BFR,
        and sends the updated copy to the BFR-NBR
    } ELSE IF BP k is LAN adjacency to Px {
        Obtains the secondary BIFT for Px,
        Clears all the BPs for the adjacencies of the BFR,
        FOR each BP j (from the rightmost in Packet's BitString) {
            IF BP j is Px's forward connected adjacency {
                Gets the forwarding entry for BP j in the secondary BIFT for Px
                Copies Packet, updates the copy's Bitstring by
                clearing all the BPs for Px's adjacencies of the BFR,
                and sends the updated copy to the BFR-NBR
            }
        } // FOR each BP j
    }
} // FOR each BP k
```

BIT INDEX EXPLICIT REPLICATION TRAFFIC ENGINEERING FOR BROADCAST LINK

CROSS-REFERENCE TO RELATED APPLICATIONS

This patent application is a continuation of International Application No. PCT/US2021/065559 filed on Dec. 29, 2021, by Futurewei Technologies, Inc., and titled "Bit Index Explicit Replication Traffic Engineering For Broadcast Link," which claims the benefit of U.S. Provisional Patent Application No. 63/132,255 filed Dec. 30, 2020 by Futurewei Technologies, Inc., and titled "BIER-TE for Broadcast Link," which is hereby incorporated by reference.

TECHNICAL FIELD

The present disclosure is generally related to the field of network communication and, in particular, to packet routing in a Bit Index Explicit Replication-Traffic/Tree Engineering (BIER-TE) domain having a broadcast link.

BACKGROUND

BIER mechanisms provide optimized forwarding of multicast data packets through a BIER domain. BIER domains may not require the use of a protocol for explicitly building multicast distribution trees. Further, BIER domains may not require intermediate nodes to maintain any per-flow state. BIER is described in further detail in Internet Engineering Task Force (IETF) document Request for Comments (RFC) 8279 entitled "Multicast Using Bit Index Explicit Replication (BIER)" by U. Wijnands, et al., published November 2017.

Traffic Engineering (TE) is the process of steering traffic across to a telecommunications network to facilitate efficient use of available bandwidth between a pair of routers. Bit Index Explicit Replication (BIER) Traffic/Tree Engineering (BIER-TE) is described in IETF document "Tree Engineering for Bit Index Explicit Replication (BIER-TE)" by T. Eckert, et al., published Jul. 9, 2021.

SUMMARY

The disclosed aspects/embodiments provide techniques that prevent an egress node on a point to multipoint (P2MP) path from receiving duplicated packets when the BIER-TE domain contains a broadcast link (a.k.a., a local area network (LAN)). To facilitate the techniques, a network node builds an improved bit index forwarding table (BIFT), which includes a main BIFT and a secondary BIFT. The main BIFT includes a forwarding entry for a local area network (LAN)-connected adjacency from the network node to a pseudo node, and the secondary BIFT includes one or more forwarding entries for forward connected adjacencies from the pseudo node to one or more neighbor network nodes. The network node utilizes the main BIFT and the secondary BIFT during packet routing to ensure that egress nodes do not receive duplicated packets. Therefore, packet routing within the BIER-TE domain is improved.

A first aspect relates to a method implemented by a network node in a Bit Index Explicit Replication Traffic/Tree Engineering (BIER-TE) domain, comprising: generating an improved bit index forwarding table (BIFT) including: a forwarding entry for a local area network (LAN)-connected adjacency from the network node to a pseudo node; and a secondary BIFT including a forwarding entry for a forward connected adjacency from the pseudo node to each of the pseudo node's next hop nodes except the network node; sending a packet containing a point to multipoint (P2MP) path with a bit position for the LAN-connected adjacency to the pseudo node according to the forwarding entry for the LAN-connected adjacency in the improved BIFT; and sending the packet to each of the pseudo node's next hop nodes on the P2MP path based on the secondary BIFT.

Optionally, in any of the preceding aspects, another implementation of the aspect provides that the improved BIFT comprises a main BIFT, and wherein the forwarding entry for the LAN-connected adjacency from the network node to the pseudo node is included in the main BIFT.

Optionally, in any of the preceding aspects, another implementation of the aspect provides that the main BIFT further comprises a forwarding entry for each adjacency from the network node to the network node's next hop nodes.

Optionally, in any of the preceding aspects, another implementation of the aspect provides that the pseudo node is a designated router (DR) of the broadcast link in an Open Shortest Path First (OSPF) protocol.

Optionally, in any of the preceding aspects, another implementation of the aspect provides that the pseudo node is a designated intermediate system (DIS) of the broadcast link in an Intermediate System-Intermediate System (IS-IS) protocol.

Optionally, in any of the preceding aspects, another implementation of the aspect provides that the forwarding entry for the LAN-connected adjacency from the network node to the pseudo node is included in a main BIFT, and wherein the main BIFT is included in the Optionally, in any of the preceding aspects, another implementation of the aspect provides that the pseudo node is represented as being disposed on a LAN in the BIER-TE domain.

A second aspect relates to network node in a Bit Index Explicit Replication Traffic/Tree Engineering (BIER-TE) domain, comprising: a memory storing instructions; and one or more processors coupled to the memory, wherein the one or more processors are configured to execute the instructions to cause the network node to: generate an improved bit index forwarding table (BIFT) including: a forwarding entry for a local area network (LAN)-connected adjacency from the network node to a pseudo node; and a secondary BIFT including a forwarding entry for a forward connected adjacency from the pseudo node to each of the pseudo node's next hop nodes except the network node; send a packet containing a point to multipoint (P2MP) path with a bit position for the LAN-connected adjacency to the pseudo node according to the forwarding entry for the LAN-connected adjacency in the improved BIFT; and send the packet to each of the pseudo node's next hop nodes on the P2MP path based on the secondary BIFT.

Optionally, in any of the preceding aspects, another implementation of the aspect provides that the improved BIFT comprises a main BIFT, and wherein the forwarding entry for the LAN-connected adjacency from the network node to the pseudo node is included in the main BIFT.

Optionally, in any of the preceding aspects, another implementation of the aspect provides that the main BIFT further comprises a forwarding entry for each adjacency from the network node to the network node's next hop nodes.

Optionally, in any of the preceding aspects, another implementation of the aspect provides that the pseudo node is a designated router (DR) of the broadcast link in an Open Shortest Path First (OSPF) protocol.

Optionally, in any of the preceding aspects, another implementation of the aspect provides that the pseudo node is a designated intermediate system (DIS) of the broadcast link in an Intermediate System-Intermediate System (IS-IS) protocol.

Optionally, in any of the preceding aspects, another implementation of the aspect provides that the forwarding entry for the LAN-connected adjacency from the network node to the pseudo node is included in a main BIFT, and wherein the main BIFT is included in the improved BIFT.

Optionally, in any of the preceding aspects, another implementation of the aspect provides that the pseudo node is represented as being disposed on a LAN in the BIER-TE domain.

A third aspect relates to a non-transitory computer readable medium comprising a computer program product for use by a network node, the computer program product comprising computer executable instructions stored on the non-transitory computer readable medium that, when executed by one or more processors, cause the network node to: generate an improved bit index forwarding table (BIFT) including: a forwarding entry for a local area network (LAN)-connected adjacency from the network node to a pseudo node; and a secondary BIFT including a forwarding entry for a forward connected adjacency from the pseudo node to each of the pseudo node's next hop nodes except the network node; send a packet containing a point to multipoint (P2MP) path with a bit position for the LAN-connected adjacency to the pseudo node according to the forwarding entry for the LAN-connected adjacency in the improved BIFT; and send the packet to each of the pseudo node's next hop nodes on the P2MP path based on the secondary BIFT.

Optionally, in any of the preceding aspects, another implementation of the aspect provides that the improved BIFT comprises a main BIFT, and wherein the forwarding entry for the LAN-connected adjacency from the network node to the pseudo node is included in the main BIFT.

Optionally, in any of the preceding aspects, another implementation of the aspect provides that the main BIFT further comprises a forwarding entry for each adjacency from the network node to the network node's next hop nodes.

Optionally, in any of the preceding aspects, another implementation of the aspect provides that the pseudo node is a designated router (DR) of the broadcast link in an Open Shortest Path First (OSPF) protocol.

Optionally, in any of the preceding aspects, another implementation of the aspect provides that the pseudo node is a designated intermediate system (DIS) of the broadcast link in an Intermediate System-Intermediate System (IS-IS) protocol.

Optionally, in any of the preceding aspects, another implementation of the aspect provides that the forwarding entry for the LAN-connected adjacency from the network node to the pseudo node is included in a main BIFT, and wherein the main BIFT is included in the improved BIFT.

Optionally, in any of the preceding aspects, another implementation of the aspect provides that the pseudo node is represented as being disposed on a LAN in the BIER-TE domain.

A fourth aspect relates to network node in a Bit Index Explicit Replication Traffic/Tree Engineering (BIER-TE) domain, comprising: means for generating an improved bit index forwarding table (BIFT) including: a forwarding entry for a local area network (LAN)-connected adjacency from the network node to a pseudo node; and a secondary BIFT including a forwarding adjacency from the pseudo node to each of the pseudo node's next hop nodes except the network node; means for sending a packet containing a point to multipoint (P2MP) path with a bit position for the LAN-connected adjacency to the pseudo node according to the forwarding entry for the LAN-connected adjacency in the improved BIFT; and means for sending the packet to each of the pseudo node's next hop nodes on the P2MP path based on the secondary BIFT.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 is a schematic diagram of a BIER-TE bit index forwarding table (BIFT) of a network node.

FIG. 3 is a schematic diagram of a BIER-TE BIFT of a network node.

FIG. 4 is a schematic diagram of a BIER-TE BIFT of a network node.

FIG. 5 is a schematic diagram of a BIER-TE BIFT of a network node.

FIG. 8 is a schematic diagram of a BIER-TE BIFT of a network node according to an embodiment of the disclosure.

FIG. 9 is a schematic diagram of a BIER-TE BIFT of a network node according to an embodiment of the disclosure.

FIG. 10 is a schematic diagram of a BIER-TE BIFT of a network node according to an embodiment of the disclosure.

FIG. 11 is a schematic diagram of a BIER-TE BIFT of a network node according to an embodiment of the disclosure.

FIG. 12 is an algorithm used to implement an improved BIER-TE BIFT to support BIER-TE with broadcast links according to an embodiment of the disclosure.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Existing techniques used to forward packets through a BIER-TE domain with a broadcast link (a.k.a., a local area network (LAN)) have drawbacks. For example, some of the egress nodes on a point to multipoint (P2MP) path end up receiving duplicate packets, which causes inefficiency and leads to unnecessary congestion within the BIER-TE domain.

Disclosed herein are techniques that prevent an egress node on a P2MP path from receiving duplicated packets when the BIER-TE domain contains a broadcast link (a.k.a., a local area network (LAN). To facilitate the techniques, a network node builds an improved bit index forwarding table (BIFT), which includes a main BIFT and a secondary BIFT. The main BIFT includes a forwarding entry (a.k.a., a row in the BIFT) for a local area network (LAN)-connected adjacency from the network node to a pseudo node, and the secondary BIFT includes one or more forwarding entries for forward connected adjacencies from the pseudo node to one or more neighbor network nodes. The network node utilizes the main BIFT and the secondary BIFT during packet routing/forwarding to ensure that egress nodes do not receive duplicated packets. Therefore, packet routing/forwarding within the BIER-TE domain is improved.

Figure 1:
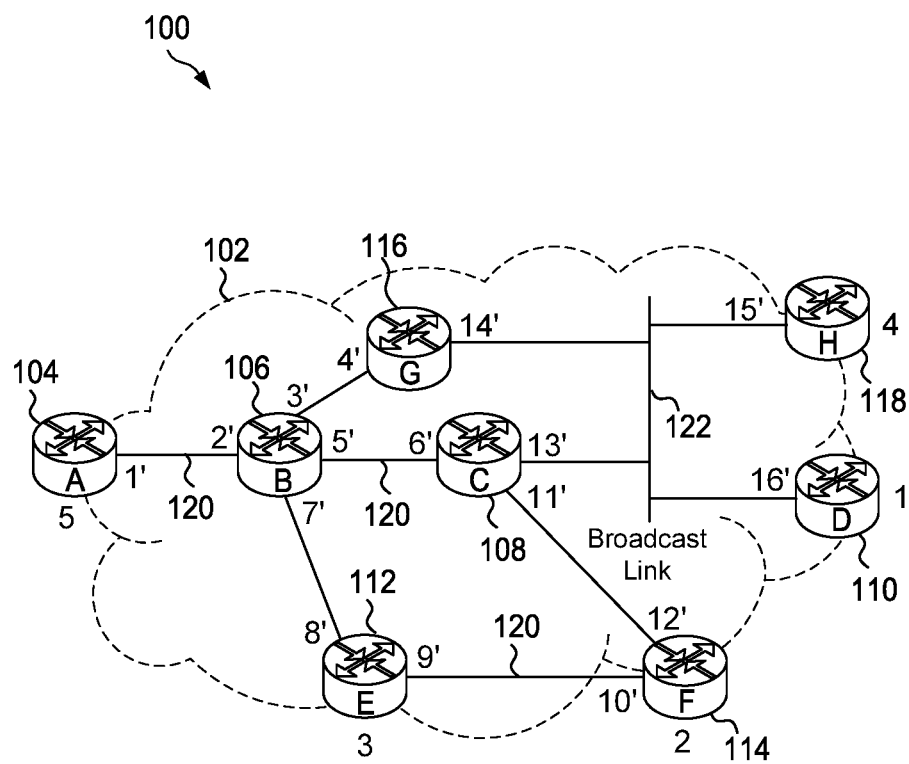
FIG. 1 is a schematic diagram of a BIER-TE topology including a BIER-TE domain.

FIG. 1 is a schematic diagram of a BIER-TE topology 100 including a BIER-TE domain 102. The BIER-TE domain 102 may be part of a larger BIER-TE domain (not shown). As such, the BIER-TE domain 102 may be referred to herein as a BIER-TE sub-domain. The BIER-TE domain 102 comprises a plurality of network nodes 104, 106, 108, 110, 112, 114, 116, and 118. While eight network nodes 104-118 are shown in the BIER-TE domain 102, more or fewer nodes may be included in practical applications.

For ease of discussion, all of the network nodes 104-118 have been given a letter designation. For example, the network node 104 has the designation A, the network node 106 has the designation B, the network node 108 has the designation C, the network node 110 has the designation D, the network node 112 has the designation E, the network node 114 has the designation F, the network node 116 has the designation G, and the network node 118 has the designation H.

Each of the network nodes 104-118 is a bit forwarding router (BFR). Some of the network nodes, namely the network nodes 104, 110, 112, 114 and 118, are disposed at an edge of the BIER-TE domain 102. The network nodes 104, 110, 112, 114 and 118 receiving multicast packets from outside the BIER-TE domain 102 may be referred to as an ingress BFR (BFIR). The network nodes 104, 110, 112, 114 and 118 transmitting multicast packets out of the BIER-TE domain 102 may be referred to as an egress BFR (BFER). Depending on the direction of multicast packet traffic, each of the network nodes 104-118 may function as a BFIR or a BFER.

As shown in FIG. 1, the bit position (BP) for forward connected (fw-con) adjacency between the various network nodes 104-118 is identified. In the illustrated example, the BP for a fw-con adjacency is represented as i', where i is an integer corresponding to one of the forward connected adjacencies between the network nodes 104-118 in the BIER-TE domain 102. In the illustrated embodiment of FIG. 1, there are sixteen total BPs for sixteen fw-con adjacencies. However, there may be more or fewer BPs for fw-con adjacencies in other BIER-TE domains in practical applications.

As an example of how the BPs for fw-con adjacencies operate with regard to FIG. 1, 2' is the BP for the fw-con adjacency from node 104 to node 106, and 1' is the BP for the fw-con adjacency from node 106 to node 104. 2' is configured on the link from node 104 to node 106 and advertised to all the network nodes in the network. 1' is configured on the link from node 106 to node 104 and advertised to all the network nodes in the network. As another example, 12' is the BP for the fw-con adjacency from node 108 to node 114, and 11' is the BP for the fw-con adjacency from node 114 to node 108. 12' is configured on the link from node 108 to node 110 and advertised to all the network nodes in the network. 11' is configured on the link from node 114 to node 108 and advertised to all the network nodes in the network. For the broadcast link (a.k.a., LAN) 122 connecting the four network nodes 108, 116, 118, and 110 in FIG. 1, four forward connected adjacency BPs 13', 14', 15' and 16' are configured on the interface from 108, 116, 118 and 110 to the LAN, respectively, and advertised to all the network nodes in the network. The other BPs for fw-con adjacencies may be determined in a similar fashion as represented by the various values for i' on FIG. 1. For ease of discussion, each BP for fw-con adjacency may be simply referred to herein as the BP or the adjacency.

Each of the network nodes 104, 110, 112, 114 and 118 may be referred to herein as a destination network node or egress BFR (BFER). The network nodes 104, 110, 112, 114 and 118 have each been assigned a BP, a set index (SI), and a bitstring. The BP of a BFER is called a local decapsulation (decap) adjacency or local decap BP. In the illustrated example, the BP of a BFER is represented as j, where j is an integer corresponding to one of the local decap adjacencies in the BIER-TE domain 102. In the illustrated embodiment of FIG. 1, there are five local decap adjacencies for five BFERs 104, 110, 112, 114 and 118. As an example, the BPs of BFERs 104, 110, 112, 114 and 118 are 5, 1, 3, 2 and 4 respectively. For simplicity, these BPs for local decap adjacencies are represented by (SI:BitString), where SI=0 and BitString is of 8 bits. BPs 1, 2, 3, 4, and 5 are collectively represented by 1 (0:00000001), 2 (0:00000010), 3 (0:00000100), 4 (0:00001000), and 5 (0:00010000), respectively. The BP of a BFER is advertised by the BFER to all the nodes in the network.

In an embodiment, the BPs for fw-con adjacencies are represented by (SI:BitString), where SI>=6 and BitString is of 8 bits. For example, the BP of 3' has a SI of 6, and has a bitstring of 00000100 (collectively represented by 3' (6:00000100)). Assuming the SI of 6 corresponds to the first set of eight BPs for fw-con adjacencies, the BP of 3' corresponds to the third bit in the bitstring from the right set to one. That is, when the SI is 6, the BP of 1' corresponds to the first bit set to one, the BP of 2' corresponds to the second bit set to one, the BP of 3' corresponds to the third bit set to one, the BP of 4' corresponds to the fourth bit set to one, and the BP of 5' corresponds to the fifth bit set to one, and so on.

Assuming the SI of 7 corresponds to the second set of eight BPs for fw-con adjacencies immediately following the first set of eight BPs for fw-con adjacencies, the BPs of 9', 10', 11', 12', 13', 14" 15' and 16' are collectively represented by 9' (7:00000001), 10' (7:00000010), 11' (7:00000100), 12' (7:00001000), 13' (7:00010000), 14' (7:00100000), 15' (7:01000000), and 16' (7:10000000), respectively. That is, when the SI is 7, the BP of 9' corresponds to the first bit set to one, the BP of 10' corresponds to the second bit set to one, the BP of 11' corresponds to the third bit set to one, the BP of 12' corresponds to the fourth bit set to one, the BP of 13' corresponds to the fifth bit set to one, and so on.

Each of the network nodes 104-118 has one or more neighbor nodes. As used herein, a neighbor node refers to a network node that is only one hop away from the network node. For example, network node 106 has four neighbor nodes in FIG. 1, namely network node 104, network node 108, network node 112, and network node 116. Indeed, each of network node 104, network node 108, network node 112, and network node 116 is only one hop away from network node 106.

The network nodes 104-118 in FIG. 1 are coupled to, and communicate with each other, via links 120. The links 120 may be wired, wireless, or some combination thereof. In an embodiment, each of the links 120 may have a cost. The cost of each of the links 120 may be the same or different, depending on the BIER-TE network and conditions therein.

As shown in FIG. 1, the BIER-TE domain 102 contains a broadcast link 122. Broadcast links connect two or more nodes and support broadcast transmission, where one node can transmit so that all other nodes can receive the same transmission. The classic Ethernet is an example. The broadcast link 122 may also be referred to herein as a LAN.

Each of the network nodes 104-118 in the BIER-TE topology 100 in FIG. 1 generates a BIER-TE BIFT. The BIER-TE BIFT for several network nodes is described below.

FIG. 2 is a schematic diagram of a BIER-TE BIFT 200 of network node. The BIER-TE BIFT 200 depicted in FIG. 2 is the BIER-TE BIFT 200 built on the network node 104 in FIG. 1. As shown, the BIER-TE BIFT 200 includes three columns of information. The first column 202 includes the BP, SI, and BitString (a.k.a., bitstring) of each adjacency directly coupled to the network node 104 in the BIER-TE topology 100. The adjacency in column 202 may be a local decapsulation (local-decap) adjacency of a destination network node (e.g., destination network node 104) or a forward connected adjacency to a neighbor network node (e.g., network node 106) from network node 104. A second column 204 indicates the action to be taken by the network node 104, which in the illustrated example is either a forward connected adjacency or a local decapsulation (local-decap). At a local decapsulation, an egress network node decapsulates the received packet and forwards the payload to the multicast overlay (which forwards the payload to a customer receiver outside the BIER-TE domain). A third column 206 identifies the neighbor node (BFR-NBR) of the network node 104 used to reach the adjacent network node identified by the adjacency in the first column 202, which is why the neighbor node in the third column 206 may also be referred to as the next hop of the network node 104.

When the network node 104 receives a packet with a P2MP path including 2', the network node 104 utilizes the first row 214 of the BIER-TE BIFT 200 to forward the packet. That is, the network node 104 sends the packet to the network node 106 (i.e., network node B) identified in the third column 206 based on the forward connected adjacency action in the second column 204. When the network node 104 receives a packet with a P2MP path including 5, the network node 104 utilizes the second row 216 of the BIER-TE BIFT 200 to decapsulate the packet and forward the payload to the multicast overlay (which forwards the payload to a customer receiver outside the BIER-TE domain 102). As such, there is no next hop listed in the third column 206 for the second row 216.

FIG. 3 is a schematic diagram of a BIER-TE BIFT 300 of network node. The BIER-TE BIFT 300 depicted in FIG. 3 is the BIER-TE BIFT 300 built on the network node 108 in FIG. 1. As shown, the BIER-TE BIFT 300 includes three columns of information. The first column 302 includes the BP, SI, and BitString of each adjacency directly coupled to the network node 108 in the BIER-TE topology 100. The adjacency in column 202 may be a local decapsulation (local-decap) adjacency of a destination network node or a forward connected adjacency to a neighbor network node (e.g., network node 106) from network node 108. A second column 304 indicates the action to be taken by the network node 108, which in the illustrated example is a forward connected adjacency. A third column 306 identifies the neighbor node (BFR-NBR) of the network node 108 used to reach the adjacent network node identified by the adjacency in the first column 302.

When the network node 108 receives a packet with a P2MP path including 5', the network node 108 utilizes the first row 314 of the BIER-TE BIFT 300 to forward the packet. That is, the network node 108 sends the packet to the network node 106 (i.e., network node B) identified in the third column 306 based on the forward connected adjacency action in the second column 304. When the network node 108 receives a packet with a P2MP path including 12', the network node 108 utilizes the second row 316 of the BIER-TE BIFT 300 to forward the packet. That is, the network node 108 sends the packet to the network node 114 (i.e., network node F) identified in the third column 306 based on the forward connected adjacency action in the second column 304. In similar fashion, the network node 108 uses the information in rows 318, 320, and 322 to forward packets with a P2MP path including 14', 15', and 16', respectively.

FIG. 4 is a schematic diagram of a BIER-TE BIFT 400 of network node. The BIER-TE BIFT 400 depicted in FIG. 4 is the BIER-TE BIFT 400 built on the network node 110 in FIG. 1. As shown, the BIER-TE BIFT 400 includes three columns of information. The first column 402 includes the BP, SI, and BitString of each adjacency directly coupled to the network node 110 in the BIER-TE topology 100. The adjacency in column 402 may be a local decapsulation (local-decap) adjacency of a destination network node (e.g., destination network node 110) or a forward connected adjacency to a neighbor network node (e.g., network node 108) from network node 110. A second column 404 indicates the action to be taken by the network node 110, which in the illustrated example is a forward connected adjacency or a local decapsulation adjacency. A third column 406 identifies the neighbor node (BFR-NBR) of the network node 110 used to reach the adjacent network node identified by the adjacency in the first column 402.

When the network node 110 receives a packet with a P2MP path including 13', the network node 110 utilizes the first row 414 of the BIER-TE BIFT 400 to forward the packet. That is, the network node 110 sends the packet to the network node 108 (i.e., network node C) identified in the third column 406 based on the forward connected adjacency action in the second column 404. In similar fashion, the network node 110 uses the information in rows 416 and 418 to forward packets with a P2MP path including 14' and 15', respectively. When the network node 110 receives a packet with a P2MP path including 1, the network node 110 utilizes the fourth row 420 of the BIER-TE BIFT 400 to decapsulate the packet and forward the payload to the multicast overlay as noted above. As such, there is no next hop listed in the third column 406 for the fourth row 420.

FIG. 5 is a schematic diagram of a BIER-TE BIFT 500 of network node. The BIER-TE BIFT 500 depicted in FIG. 5 is the BIER-TE BIFT 500 built on the network node 116 in FIG. 1. As shown, the BIER-TE BIFT 500 includes three columns of information. The first column 502 includes the BP, SI, and BitString of each adjacency directly coupled to the network node 116 in the BIER-TE topology 100. The adjacency in column 502 may be a local decapsulation (local-decap) adjacency of a destination network node or a forward connected adjacency to a neighbor network node (e.g., network node 106) from network node 116. A second column 504 indicates the action to be taken by the network node 116, which in the illustrated example is a forward connected adjacency. A third column 506 identifies the neighbor node (BFR-NBR) of the network node 116 used to reach the adjacent network node identified by the adjacency in the first column 502.

When the network node 116 receives a packet with a P2MP path including 3', the network node 116 utilizes the first row 514 of the BIER-TE BIFT 500 to forward the packet. That is, the network node 116 sends the packet to the network node 106 (i.e., network node B) identified in the third column 506 based on the forward connected adjacency action in the second column 504. In similar fashion, the network node 116 uses the information in rows 516, 518, and 520 to forward packets with a P2MP path including 13', 15', and 16', respectively.

Figure 6:
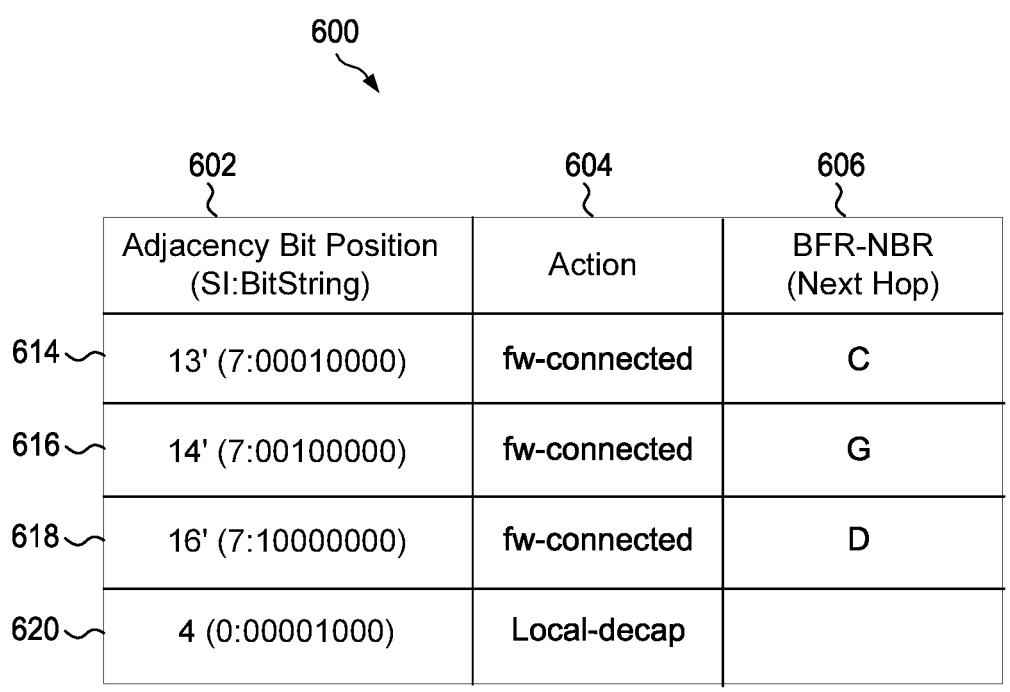
FIG. 6 is a schematic diagram of a BIER-TE BIFT of a network node.

FIG. 6 is a schematic diagram of a BIER-TE BIFT 600 of network node. The BIER-TE BIFT 600 depicted in FIG. 6 is the BIER-TE BIFT 600 built on the network node 118 in FIG. 1. As shown, the BIER-TE BIFT 600 includes three columns of information. The first column 602 includes the BP, SI, and BitString of each adjacency directly coupled to the network node 118 in the BIER-TE topology 100. The adjacency in column 602 may be a local decapsulation (local-decap) adjacency of a destination network node (e.g., destination network node 118) or a forward connected adjacency to a neighbor network node (e.g., network node 116) from network node 118. A second column 604 indicates the action to be taken by the network node 118, which in the illustrated example is a forward connected adjacency or a local decapsulation adjacency. A third column 606 identifies the neighbor node (BFR-NBR) of the network node 118 used to reach the adjacent network node identified by the adjacency in the first column 602.

When the network node 118 receives a packet with a P2MP path including 13', the network node 118 utilizes the first row 614 of the BIER-TE BIFT 600 to forward the packet. That is, the network node 118 sends the packet to the network node 108 (i.e., network node C) identified in the third column 606 based on the forward connected adjacency action in the second column 604. In similar fashion, the network node 118 uses the information in rows 616 and 618 to forward packets with a P2MP path including 14' and 16', respectively. When the network node 118 receives a packet with a P2MP path including 4, the network node 118 utilizes the fourth row 620 of the BIER-TE BIFT 600 to decapsulate the packet and forward the payload to the multicast overlay as noted above. As such, there is no next hop listed in the third column 606 for the fourth row 620.

Keeping the above in mind, an example of how a multicast packet (or simply, packet) would progress through the BIER-TE domain 102 in FIG. 1. To begin, network node 104 adds or encapsulates a P2MP path (or simply, path) into the packet. The path could be from node 104 to destination nodes 114 and 118, for example, {2', 4', 6', 12', 15', 2, 4}. Network node 104 then removes adjacency 2' from the packet and sends the packet to network node 106.

Network node 106 receives a packet with path {4', 6', 12', 15', 2, 4}. Because 4' and 6' are the forward connected adjacencies to next hops (i.e., network nodes 116 and 108) of network node 106, network node 106 removes adjacencies 4' and 6' from the packet and sends a copy of the packet to network node 116 and sends another copy of the packet to network node 108.

Network node 116 receives a packet with path {12', 15', 2, 4}. Because 15' is the forward connected adjacency to next hop node 118 of network node 116, network node 116 removes adjacency 15' from the packet and sends a copy of the packet to network node 118.

Network node 118 receives a packet with path {12', 2, 4}. Network node 118 decapsulates the packet with the BP of 4 (which is the local decapsulation adjacency of node 118) and sends the payload of the packet to the multicast overlay.

Network node 108 receives a packet with path {12', 15', 2, 4}. Because 12' and 15' are the forward connected adjacencies to next hop nodes 114 and 118 of network node 108, network node 108 removes adjacencies 12' and 15' from the packet and sends a copy of the packet to network node 114 and another copy of the packet to network node 118.

Network node 114 receives a packet with path {2, 4}. Network node 114 decapsulates the packet with the BP of 2 (which is the local decapsulation adjacency of node 114) and sends the payload of the packet to the multicast overlay.

Despite already receiving a copy of the packet from node 116, network node 118 receives another copy of the packet with path {2, 4} from network node 108. Network node 118 decapsulates the packet with the BP of 4 (which is the local decapsulation adjacency of node 118) and again sends the payload of the packet to the multicast overlay. Thus, the network node 118 has received a duplicate packet. To avoid such duplication, the following may be utilized.

Figure 7:
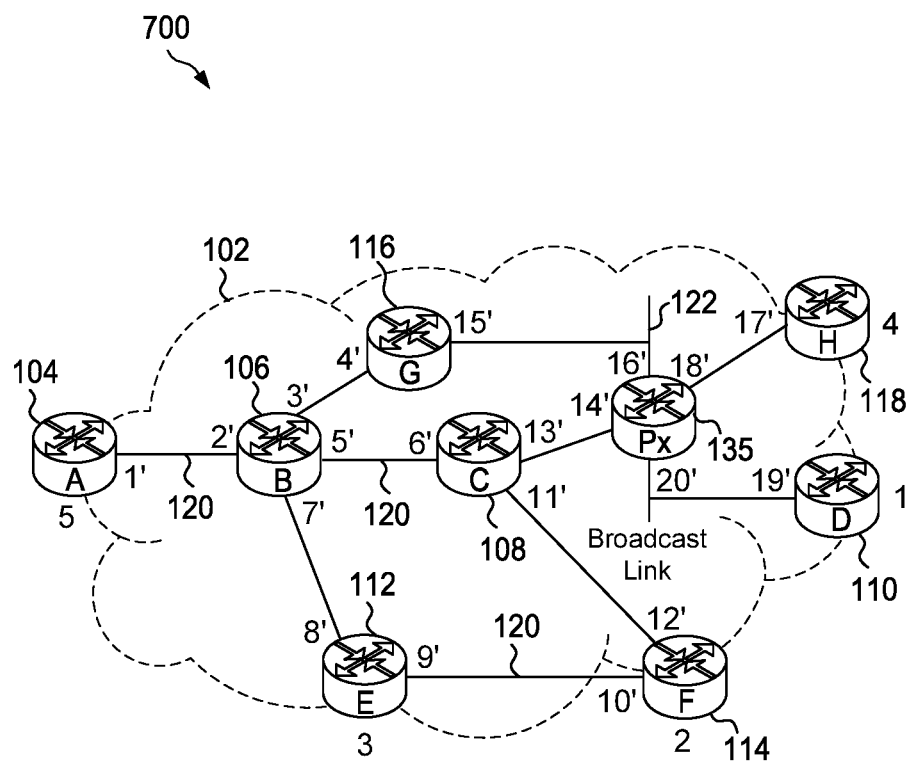
FIG. 7 is a schematic diagram of a BIER-TE topology including a BIER-TE domain including a pseudo node according to an embodiment of the disclosure.

FIG. 7 is a schematic diagram of a BIER-TE topology 700 including a BIER-TE domain 102 including a pseudo node 135 according to an embodiment of the disclosure. The BIER-TE topology 700 is similar to the BIER-TE topology 100 of FIG. 1. Therefore, a description of like elements is not repeated herein.

Unlike the BIET-TE topology 100 of FIG. 1, the BIER-TE topology 700 of FIG. 7 includes the pseudo node 135 (e.g., network node Px). The pseudo node 135 is represented as being disposed on the broadcast link 122 and having neighbor network nodes (i.e., next hops) including network node 116, network node 108, network node 118, and network node 110. In an embodiment, the pseudo node is a designated router (DR) of the broadcast link in an Open Shortest Path First (OSPF) protocol. In an embodiment, the pseudo node is a designated intermediate system (DIS) of the broadcast link in an Intermediate System-Intermediate System (IS-IS) protocol.

Each link 120 connecting the pseudo node 135 to one of the neighbor network nodes is assigned two BPs. One BP is for LAN-connected adjacency (a.k.a., the LAN adjacency) from the neighbor network node to the pseudo node 135, and the other BP is for the forward connected adjacency from the pseudo node 135 to neighbor network node. For example, the forward connected adjacency from the pseudo node 135 to network node 108 is assigned BP 13', and the LAN-connected adjacency from network node 108 to the pseudo node 135 is assigned BP 14'. In addition, the forward connected adjacency from pseudo node 135 to network node 116 is assigned BP 15', and the LAN-connected adjacency from network node 116 to pseudo node 135 is assigned BP 16'. Likewise, the forward connected adjacency from pseudo node 135 to network node 118 is assigned BP 17', and the LAN-connected adjacency from network node 118 to pseudo node 135 is assigned BP 18'. Finally, the forward connected adjacency from pseudo node 135 to network node 110 is assigned BP 19', and the LAN-connected adjacency from network node 110 to pseudo node 135 is assigned BP 20'.

Any network node that is a next hop of pseudo node 135 includes an improved BIER-TE BIFT. In an embodiment, the improved BIER-TE BIFT comprises a main BIER TE BIFT and a secondary BIER-TE BIFT. For any network node that is not a next hop of pseudo node 135, the regular or normal BIER-TE BIFT as illustrated in FIGS. 2-6 is utilized.

Still referring to FIG. 7, the network nodes 116, 118, 108, and 110 are each a next hop or neighbor network node of pseudo node 135. Therefore, the network nodes 116, 118, 108, and 110 each utilize an improved BIFT. In contrast, the network nodes 104, 106, 112, and 114 do not utilize the improved BIFT.

FIGS. 8-9 are each a schematic diagram of a BIER-TE BIFT of a network node according to an embodiment of the disclosure. FIG. 8 illustrates the main BIER-TE BIFT 800 built on and utilized by network node 108 in FIG. 7, while FIG. 9 illustrates the secondary BIER-TE BIFT 900 built on and utilized by network node 108 in FIG. 7. The main BIER-TE BIFT 800 and the secondary BIER-TE BIFT 900 collectively form the improved BIER-TE BIFT. Because the improved BIER-TE BIFT of FIGS. 8-9 is built on and utilized by network node 108, the actions performed by the pseudo node 135, which are represented by quotes in the description below, are actually taken by the network node 108.

As shown, the main BIER-TE BIFT 800 includes three columns of information. The first column 802 includes the BP, SI, and BitString (a.k.a., bitstring) of each adjacency directly coupled to the network node 108 in the BIER-TE topology 700. The adjacency in column 802 may be a local decapsulation (local-decap) adjacency of a destination network node, a forward connected adjacency to a neighbor network node (e.g., network node 106) from network node 108, or a LAN-connected adjacency to the pseudo node 135 from network node 108. A second column 804 indicates the action to be taken by the network node 108, which in the illustrated example is either a forward connected adjacency or a LAN-connected adjacency (LAN-connected). A third column 806 identifies the neighbor node (BFR-NBR) of the network node 108 used to reach the adjacent network node identified by the adjacency in the first column 802, which is why the neighbor node in the third column 806 may also be referred to as the next hop of the network node 108.

When the network node 108 receives a packet with a P2MP path including 5', the network node 108 utilizes the first row 814 of the main BIER-TE BIFT 800 to forward the packet. That is, the network node 108 sends the packet to the network node 106 (i.e., network node B) identified in the third column 806 based on the forward connected adjacency action in the second column 804. When the network node 108 receives a packet with a P2MP path including 12', the network node 108 utilizes the second row 816 of the main BIER-TE BIFT 800 to forward the packet. That is, the network node 108 sends the packet to the network node 114 (i.e., network node F) identified in the third column 806 based on the forward connected adjacency action in the second column 804. When the network node 108 receives a packet with a P2MP path including 14', the network node 108 utilizes the third row 818 of the main BIER-TE BIFT 800 to forward the packet. That is, the network node 108 "sends" (i.e., works as sending) the packet to the pseudo network node 135 (i.e., network node Px) identified in the third column 806 based on the LAN-connected adjacency action in the second column 804. Notably, the main BIER-TE BIFT 800 contains a forwarding entry for each of the adjacencies from the network node 108, including the one for the LAN-connected adjacency from the network node 108 to the pseudo node 135 of the LAN. In an embodiment, the forwarding entry is a row in the forwarding table.

As shown, the secondary BIER-TE BIFT 900 includes three columns of information. The first column 902 includes the BP, SI, and BitString (a.k.a., bitstring) of each adjacency directly coupled to the pseudo node 135 in the BIER-TE topology 700. The adjacency in column 802 may be a forward connected adjacency to a network node (e.g., network node 116, network node 118, network node 110) from the pseudo node 135. A second column 904 indicates the action to be taken by the pseudo node 135, which in the illustrated example is a forward connected adjacency. A third column 906 identifies the neighbor node (BFR-NBR) of the pseudo node 135 used to reach the adjacent network node identified by the adjacency in the first column 902, which is why the neighbor node in the third column 906 may also be referred to as the next hop of the pseudo node 135.

When the pseudo node 135 "receives" a packet with a P2MP path including 15', the pseudo node 135 utilizes the first row 914 (a.k.a., the forwarding entry) of the secondary BIER-TE BIFT 900 to forward the packet. That is, the pseudo node 135 "sends" the packet to the network node 116 (i.e., network node G) identified in the third column 906 based on the forward connected adjacency action in the second column 904. When the pseudo node 135 "receives" a packet with a P2MP path including 17', the pseudo node 135 utilizes the second row 916 of the secondary BIER-TE BIFT 900 to forward the packet. That is, the pseudo node 135 "sends" the packet to the network node 118 (i.e., network node H) identified in the third column 906 based on the forward connected adjacency action in the second column 904. When the pseudo node 135 "receives" a packet with a P2MP path including 19', the pseudo node 135 utilizes the third row 918 of the secondary BIER-TE BIFT 900 to forward the packet. That is, the pseudo node 135 "sends" (i.e., works as sending) the packet to the network node 110 (i.e., network node D) identified in the third column 906 based on the forward connected adjacency action in the second column 904. Notably, the secondary BIER-TE BIFT 900 contains a forwarding entry for each of the adjacencies from the pseudo node 135 to each neighbor network node connected to the LAN 122 (a.k.a., the broadcast link), except for the adjacency from the pseudo node 135 to the network node 108.

FIGS. 10-11 are each a schematic diagram of a BIER-TE BIFT of a network node according to an embodiment of the disclosure. FIG. 10 illustrates the main BIER-TE BIFT 1000 built on and utilized by network node 118 in FIG. 7, while FIG. 11 illustrates the secondary BIER-TE BIFT 1100 built on and utilized by network node 118 in FIG. 7. The main BIER-TE BIFT 1000 and the secondary BIER-TE BIFT 1100 collectively form the improved BIER-TE BIFT. Because the improved BIER-TE BIFT of FIGS. 10-11 is built on and utilized by network node 118, the actions performed by the pseudo node 135, which are represented by quotes in the description below, are actually taken by the network node 118.

As shown, the main BIER-TE BIFT 1000 includes three columns of information. The first column 1002 includes the BP, SI, and BitString (a.k.a., bitstring) of each adjacency directly coupled to the network node 118 in the BIER-TE topology 700. The adjacency in column 1002 may be a local decapsulation (local-decap) adjacency of a destination network node (e.g., network node 118) or a LAN-connected adjacency to the pseudo node 135 from network node 118. A second column 1004 indicates the action to be taken by the network node 118, which in the illustrated example is either a LAN-connected adjacency or a local decapsulation (local-decap). At a local decapsulation, an egress network node decapsulates the received packet and forwards the payload to the multicast overlay (which forwards the payload to a customer receiver outside the BIER-TE domain). A third column 1006 identifies the neighbor node (BFR-NBR) of the network node 118 used to reach the adjacent network node identified by the adjacency in the first column 1002, which is why the neighbor node in the third column 1006 may also be referred to as the next hop of the network node 118.

When the network node 118 receives a packet with a P2MP path including 4, the network node 118 utilizes the first row 1014 of the main BIER-TE BIFT 1000 to decapsulate the packet and forward the payload to the multicast overlay (which forwards the payload to a customer receiver outside the BIER-TE domain 102). As such, there is no next hop listed in the third column 1006 for the first row 1014. When the network node 118 receives a packet with a P2MP path including 18', the network node 118 utilizes the second row 1016 of the main BIER-TE BIFT 1000 to forward the packet. That is, the network node 118 "sends" (i.e., works as sending) the packet to the pseudo network node 135 (i.e., network node Px) identified in the third column 1006 based on the forward connected adjacency action in the second column 1004. Notably, the main BIER-TE BIFT 1000 contains a forwarding entry for each of the adjacencies from the network node 118, including the one for the LAN-connected adjacency from the network node 118 to the pseudo node 135 of the LAN.

As shown, the secondary BIER-TE BIFT 1100 includes three columns of information. The first column 1102 includes the BP, SI, and BitString (a.k.a., bitstring) of each adjacency directly coupled to the pseudo node 135 in the BIER-TE topology 700. The adjacency in column 1102 may be a forward connected adjacency to a neighbor network node (e.g., network node 108, network node 116) from the pseudo node 135. A second column 1104 indicates the action to be taken by the pseudo node 135, which in the illustrated example is a forward connected adjacency. A third column 1106 identifies the neighbor node (BFR-NBR) of the pseudo node 135 used to reach the adjacent network node identified by the adjacency in the first column 1102, which is why the neighbor node in the third column 1106 may also be referred to as the next hop of the pseudo node 135.

When the pseudo node 135 "receives" a packet with a P2MP path including 13', the pseudo node 135 utilizes the first row 1114 of the secondary BIER-TE BIFT 1100 to forward the packet. That is, the pseudo node 135 "sends" the packet to the network node 108 (i.e., network node C) identified in third column 1106 based on the forward connected adjacency action in the second column 1104. When the pseudo node 135 "receives" a packet with a P2MP path including 15', the pseudo node 135 utilizes the second row 1116 of the secondary BIER-TE BIFT 1100 to forward the packet. That is, the pseudo node 135 "sends" the packet to the network node 116 (i.e., network node G) identified in the third column 1106 based on the forward connected adjacency action in the second column 1104. When the pseudo node 135 "receives" a packet with a P2MP path including 19', the pseudo node 135 utilizes the third row 1118 of the secondary BIER-TE BIFT 1100 to forward the packet. That is, the pseudo node 135 "sends" (i.e., works as sending) the packet to the network node 110 (i.e., network node D) identified in the third column 1106 based on the forward connected adjacency action in the second column 1104. Notably, the secondary BIER-TE BIFT 1100 contains a forwarding entry for each of the adjacencies from the pseudo node 135 to each neighbor network node connected to the LAN 122 (a.k.a., the broadcast link), except for the adjacency from the pseudo node 135 to the network node 118.

FIG. 12 is an algorithm 1200 used to implement a portion of the forwarding procedure using the improved BIER-TE BIFT according to an embodiment of the disclosure. In particular, the algorithm 1200 may be used to clear a bit in the bitstring of a packet as described above.

Upon receipt of a packet, for each BP k (from the right in the BitString of the packet), if the BP k is the local decapsulation adjacency, the network node copies the packet and sends the copy to the multicast flow overlay and clears bit k in the packet's BitString. Otherwise, if the BP k is the forward connected adjacency of the network node (e.g., BFR), the network node finds the forwarding entry in the improved BIER-TE BIFT for the domain using BP k, copies the packet, updates the copy's BitString by clearing all the BPs for the adjacencies of the network node, and sends the updated copy to the neighbor network node. Otherwise, if the BP k is LAN-connected adjacency to the pseudo node (Px), the network node obtains the secondary BIER-TE BIFT for Px, and clears all the BPs for the adjacencies of the network node. For each BP j (from the right in the BitString of the packet), if BP j is Px's forward connected adjacency, the network node gets the forwarding entry for BP j in the secondary BIER-TE BIFT for Px, copies the packet, updates the copy's BitString by clearing all the BPs for Px's adjacencies of the network node, and sends the updated copy to the neighbor network node. This process is repeated for each BP j, and for each BP k.

Stated another way, for a multicast packet containing the BitString encoding an explicit P2MP path, if the BP in the BitString is for a LAN-connected adjacency to pseudo node Px for the LAN, the updated forwarding procedure on a BFR sends the packet towards Px's next hop nodes on the P2MP path encoded in the packet.

The procedure on a BFR "sends" (i.e., works as sending) the packet with the BP for the LAN-connected adjacency to Px according to the forwarding entry for the BP. And then the BFR acts on Px to "send" (i.e., works as sending) the packet to each of the Px's next hop nodes that are on the P2MP path based on the secondary BIFT for Px.

The BFR obtains the secondary BIFT for Px on the BFR, clears all the BPs for the adjacencies of the BFR including the adjacency from the BFR to Px, and copies and sends the packet to each of the Px's next hop nodes on the P2MP path based on the secondary BIFT for Px.

Keeping the above in mind, an example of how a multicast packet (or simply, packet) would progress through the BIER-TE domain 102 in FIG. 7. To begin, network node 104 adds or encapsulates a P2MP path (or simply, path) into the packet. The path could be from node 104 to destination nodes 114 and 118, for example, {2', 4', 6', 12', 16', 17', 2, 4}. Network node 104 then removes adjacency 2' from the packet and sends the packet to network node 106.

Network node 106 receives a packet with path {4', 6', 12', 16', 17', 2, 4}. Because 4' and 6' are the forward connected adjacencies to next hops 116 and 108 of network node 106, network node 106 removes adjacencies 4' and 6' from the packet and sends a copy of the packet to network node 116 and sends another copy of the packet to network node 108.

Network node 116 receives a packet with path {12', 16', 17', 2, 4}, removes the adjacency 16' from the packet, and "sends" the packet to pseudo node 135 using 16' in the main BIER-TE BIFT of the improved BIER-TE BIFT. After receiving the packet from network node 116, the pseudo node 135 "sends" the packet to network node 118 according to the forwarding entry of 17' in the secondary BIER-TE BIFT of the improved BIER-TE BIFT for the pseudo node (which is a part of the improved BIER-TE BIFT of network node 116).

Network node 118 receives a packet with path {12', 2, 4}. Network node 118 decapsulates the packet with the BP of 4 (which is the local decapsulation adjacency of node 118) and sends the payload of the packet to the multicast overlay.

Network node 108 receives a packet with path {12', 16', 17', 2, 4}. Because 12' is forward connected adjacency to next hop node 114 of network node 108, network node 108 removes adjacency 12' from the packet and sends a copy of the packet to network node 114.

Network node 114 receives a packet with path {16', 17', 2, 4}. Network node 114 decapsulates the packet with the BP of 2 (which is the local decapsulation adjacency of node 114) and sends the payload of the packet to the multicast overlay.

Unlike the example of how a multicast packet would progress through the BIER-TE domain 102 in FIG. 1, the example of how a multicast packet would progress through the BIER-TE domain 102 in FIG. 7 avoids a duplicate packet being sent to, and received by, the network node 118. That is, the network node 118 no longer receives a duplicated packet in the latter example.

Figure 13:
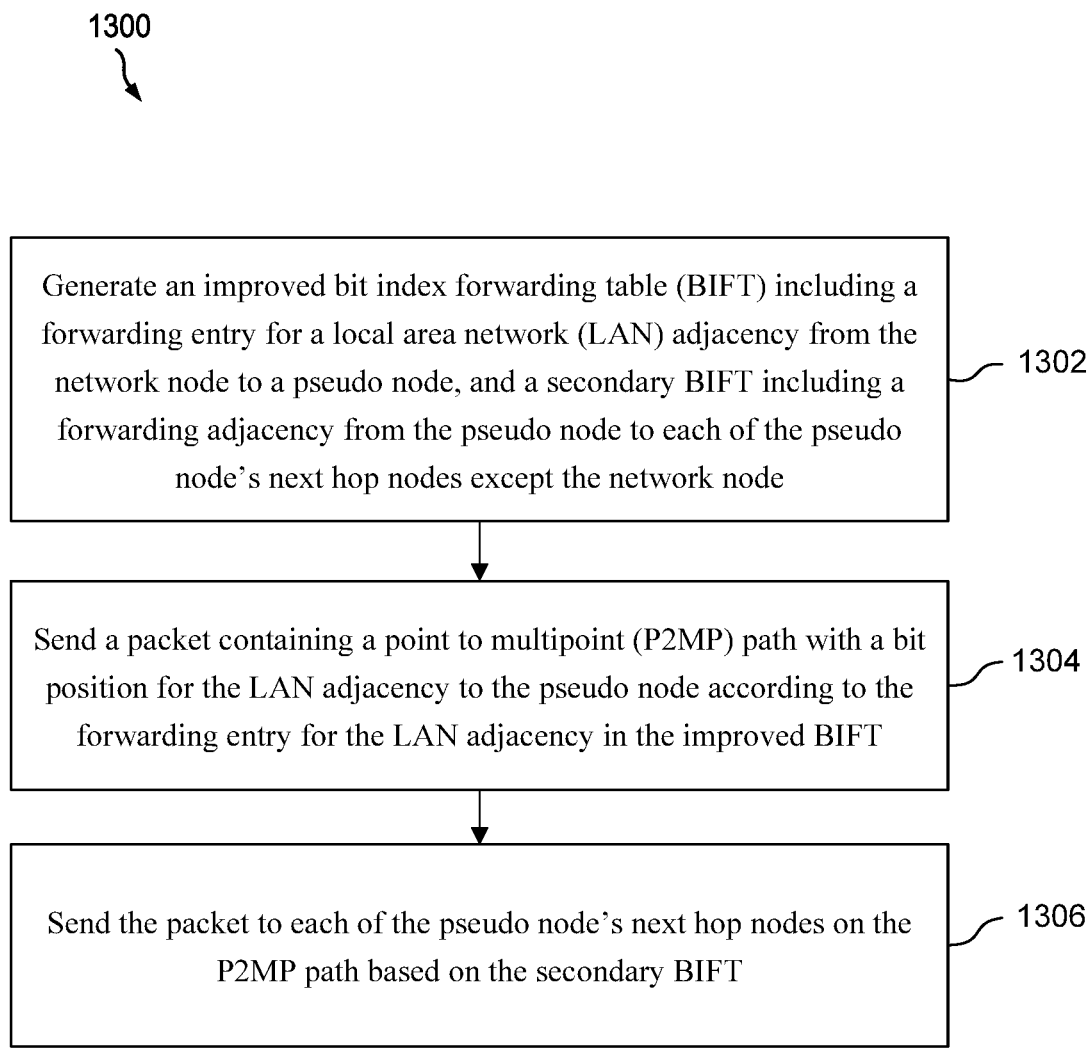
FIG. 13 is a method implemented by a network node in the BIER-TE domain according to an embodiment of the disclosure.

FIG. 13 is a method 1300 implemented by a network node (e.g., network node 108) in the BIER-TE domain according to an embodiment of the disclosure. The method may be performed by the network node to prevent a destination egress node (e.g., network node 118) from receiving duplicate packets.

In block 1302, the network node generates an improved bit index forwarding table (BIFT), which includes a forwarding entry for a LAN-connected adjacency from the network node to a pseudo node, and a secondary BIFT including a forwarding adjacency from the pseudo node to each of the pseudo node's next hop nodes except the network node.

In an embodiment, the improved BIFT comprises a main BIFT, and wherein the forwarding entry for the LAN-connected adjacency from the network node to the pseudo node is included the main BIFT. In an embodiment, the main BIFT further comprises a forwarding entry for each adjacency from the network node to the network node's next hop nodes.

In an embodiment, the pseudo node is a designated router (DR) of the broadcast link in an Open Shortest Path First (OSPF) protocol. In an embodiment, the pseudo node is a designated intermediate system (DIS) of the broadcast link in an Intermediate System-Intermediate System (IS-IS) protocol. In an embodiment, the forwarding entry for the LAN-connected adjacency from the network node to the pseudo node is included in a main BIFT, and the main BIFT is included in the improved BIFT. In an embodiment, the pseudo node is represented as being disposed on a LAN in the BIER-TE domain.

In block 1304, the network node sends a packet containing a point to multipoint (P2MP) path with a bit position for the LAN-connected adjacency to the pseudo node according to the forwarding entry for the LAN-connected adjacency in the improved BIFT. In block 1306, the network node sends the packet to each of the pseudo node's next hop nodes on the P2MP path based on the secondary BIFT.

Figure 14:
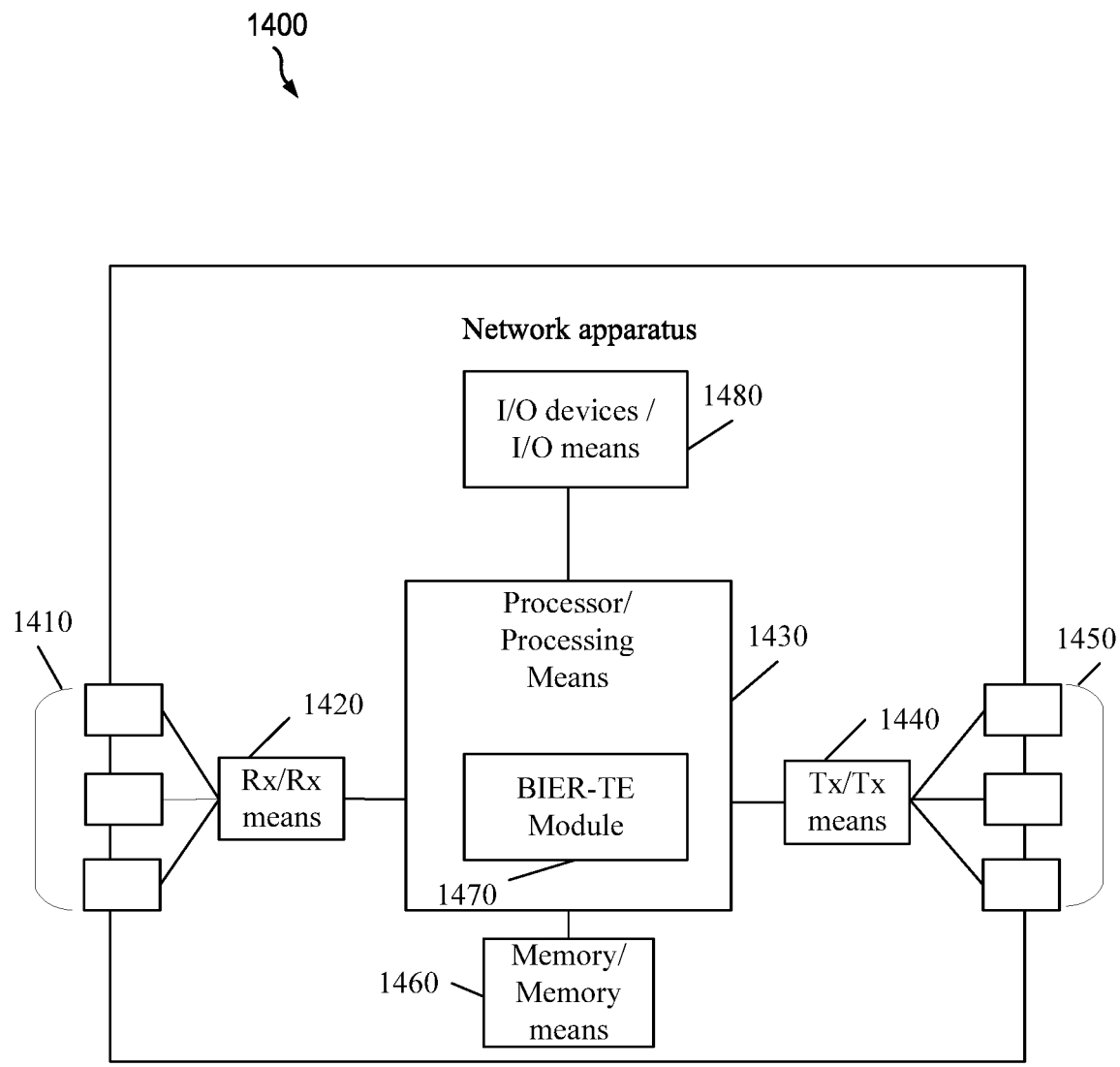
FIG. 14 is a schematic diagram of a network apparatus according to an embodiment of the disclosure.

FIG. 14 is a schematic diagram of a network apparatus 1400 (e.g., a network node, a destination node, a neighbor node, etc.). The network apparatus 1400 is suitable for implementing the disclosed embodiments as described herein. The network apparatus 1400 comprises ingress ports/ingress means 1410 (a.k.a., upstream ports) and receiver units (Rx)/receiving means 1420 for receiving data; a processor, logic unit, or central processing unit (CPU)/processing means 1430 to process the data; transmitter units (Tx)/transmitting means 1440 and egress ports/egress means 1450 (a.k.a., downstream ports) for transmitting the data; and a memory/memory means 1460 for storing the data. The network apparatus 1400 may also comprise optical-to-electrical (OE) components and electrical-to-optical (EO) components coupled to the ingress ports/ingress means 1410, the receiver units/receiving means 1420, the transmitter units/transmitting means 1440, and the egress ports/egress means 1450 for egress or ingress of optical or electrical signals.

The processor/processing means 1430 is implemented by hardware and software. The processor/processing means 1430 may be implemented as one or more CPU chips, cores (e.g., as a multi-core processor), field-programmable gate arrays (FPGAs), application specific integrated circuits (ASICs), and digital signal processors (DSPs). The processor/processing means 1430 is in communication with the ingress ports/ingress means 1410, receiver units/receiving means 1420, transmitter units/transmitting means 1440, egress ports/egress means 1450, and memory/memory means 1460. The processor/processing means 1430 comprises a BIER-TE module 1470. The BIER-TE module 1470 is able to implement the methods disclosed herein. The inclusion of the BIER-TE module 1470 therefore provides a substantial improvement to the functionality of the network apparatus 1400 and effects a transformation of the network apparatus 1400 to a different state. Alternatively, the BIER-TE module 1470 is implemented as instructions stored in the memory/memory means 1460 and executed by the processor/processing means 1430.

The network apparatus 1400 may also include input and/or output (I/O) devices or I/O means 1480 for communicating data to and from a user. The I/O devices or I/O means 1480 may include output devices such as a display for displaying video data, speakers for outputting audio data, etc. The I/O devices or I/O means 1480 may also include input devices, such as a keyboard, mouse, trackball, etc., and/or corresponding interfaces for interacting with such output devices.

The memory/memory means 1460 comprises one or more disks, tape drives, and solid-state drives and may be used as an over-flow data storage device, to store programs when such programs are selected for execution, and to store instructions and data that are read during program execution. The memory/memory means 1460 may be volatile and/or non-volatile and may be read-only memory (ROM), random access memory (RAM), ternary content-addressable memory (TCAM), and/or static random-access memory (SRAM).

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by a network node in a Bit Index Explicit Replication Traffic/Tree Engineering (BIER-TE) domain, comprising:
   generating an improved bit index forwarding table (BIFT) including:
      a forwarding entry for a local area network (LAN)-connected adjacency from the network node to a pseudo node; and
      a secondary BIFT including a forwarding entry for a forward connected adjacency from the pseudo node to each of the pseudo node's next hop nodes except the network node;
   sending a packet containing a point to multipoint (P2MP) path with a bit position for the LAN-connected adjacency to the pseudo node according to the forwarding entry for the LAN-connected adjacency in the improved BIFT; and
   sending the packet to each of the pseudo node's next hop nodes on the P2MP path based on the secondary BIFT.

2. The method of claim 1, wherein the improved BIFT comprises a main BIFT, and wherein the forwarding entry for the LAN-connected adjacency from the network node to the pseudo node is included in the main BIFT.

3. The method of claim 2, wherein the main BIFT further comprises a forwarding entry for each adjacency from the network node to the network node's next hop nodes.

4. The method of claim 1, wherein the pseudo node is a designated router (DR) of a broadcast link in an Open Shortest Path First (OSPF) protocol.

5. The method of claim 1, wherein the pseudo node is a designated intermediate system (DIS) of a broadcast link in an Intermediate System-Intermediate System (IS-IS) protocol.

6. The method of claim 1, wherein the forwarding entry for the LAN-connected adjacency from the network node to the pseudo node is included in a main BIFT, and wherein the main BIFT is included in the improved BIFT.

7. The method of claim 1, wherein the pseudo node is represented as being disposed on a LAN in the BIER-TE domain.

8. A network node in a Bit Index Explicit Replication Traffic/Tree Engineering (BIER-TE) domain, comprising:
   a memory storing instructions; and
   one or more processors coupled to the memory, wherein the one or more processors are configured to execute the instructions to cause the network node to:
      generate an improved bit index forwarding table (BIFT) including:
         a forwarding entry for a local area network (LAN)-connected adjacency from the network node to a pseudo node; and
         a secondary BIFT including a forwarding entry for a forward connected adjacency from the pseudo node to each of the pseudo node's next hop nodes except the network node;
      send a packet containing a point to multipoint (P2MP) path with a bit position for the LAN-connected adjacency to the pseudo node according to the forwarding entry for the LAN-connected adjacency in the improved BIFT; and
      send the packet to each of the pseudo node's next hop nodes on the P2MP path based on the secondary BIFT.

9. The network node of claim 8, wherein the improved BIFT comprises a main BIFT, and wherein the forwarding entry for the LAN-connected adjacency from the network node to the pseudo node is included in the main BIFT.

10. The network node of claim 9, wherein the main BIFT further comprises a forwarding entry for each adjacency from the network node to the network node's next hop nodes.

11. The network node of claim 8, wherein the pseudo node is a designated router (DR) of a broadcast link in an Open Shortest Path First (OSPF) protocol.

12. The network node of claim 8, wherein the pseudo node is a designated intermediate system (DIS) of a broadcast link in an Intermediate System-Intermediate System (IS-IS) protocol.

13. The network node of claim 8, wherein the forwarding entry for the LAN-connected adjacency from the network node to the pseudo node is included in a main BIFT, and wherein the main BIFT is included in the improved BIFT.

14. The network node of claim 8, wherein the pseudo node is represented as being disposed on a LAN in the BIER-TE domain.

15. A non-transitory computer readable medium comprising a computer program product for use by a network node, the computer program product comprising computer executable instructions stored on the non-transitory computer readable medium that, when executed by one or more processors, cause the network node to:
   generate an improved bit index forwarding table (BIFT) including:
      a forwarding entry for a local area network (LAN)-connected adjacency from the network node to a pseudo node; and
      a secondary BIFT including a forwarding entry for a forward connected adjacency from the pseudo node to each of the pseudo node's next hop nodes except the network node;
   send a packet containing a point to multipoint (P2MP) path with a bit position for the LAN-connected adjacency to the pseudo node according to the forwarding entry for the LAN-connected adjacency in the improved BIFT; and
   send the packet to each of the pseudo node's next hop nodes on the P2MP path based on the secondary BIFT.

16. The non-transitory computer readable medium of claim 15, wherein the improved BIFT comprises a main BIFT, and wherein the forwarding entry for the LAN-connected adjacency from the network node to the pseudo node is included in the main BIFT.

17. The non-transitory computer readable medium of claim 16, wherein the main BIFT further comprises a forwarding entry for each adjacency from the network node to the network node's next hop nodes.

18. The non-transitory computer readable medium of claim 15, wherein the pseudo node is a designated router (DR) of a broadcast link in an Open Shortest Path First (OSPF) protocol.

19. The non-transitory computer readable medium of claim 15, wherein the pseudo node is a designated intermediate system (DIS) of a broadcast link in an Intermediate System-Intermediate System (IS-IS) protocol.

20. The non-transitory computer readable medium of claim 15, wherein the forwarding entry for the LAN-connected adjacency from the network node to the pseudo node is included in a main BIFT, and wherein the main BIFT is included in the improved BIFT.

21. The non-transitory computer readable medium of claim 15, wherein the pseudo node is represented as being disposed on a LAN in a Bit Index Explicit Replication Traffic/Tree Engineering (BIER-TE) domain.

* * * * *